May 2, 1933.  J. A. HENRY ET AL  1,906,856
REGISTER
Filed Oct. 29, 1931   3 Sheets-Sheet 3
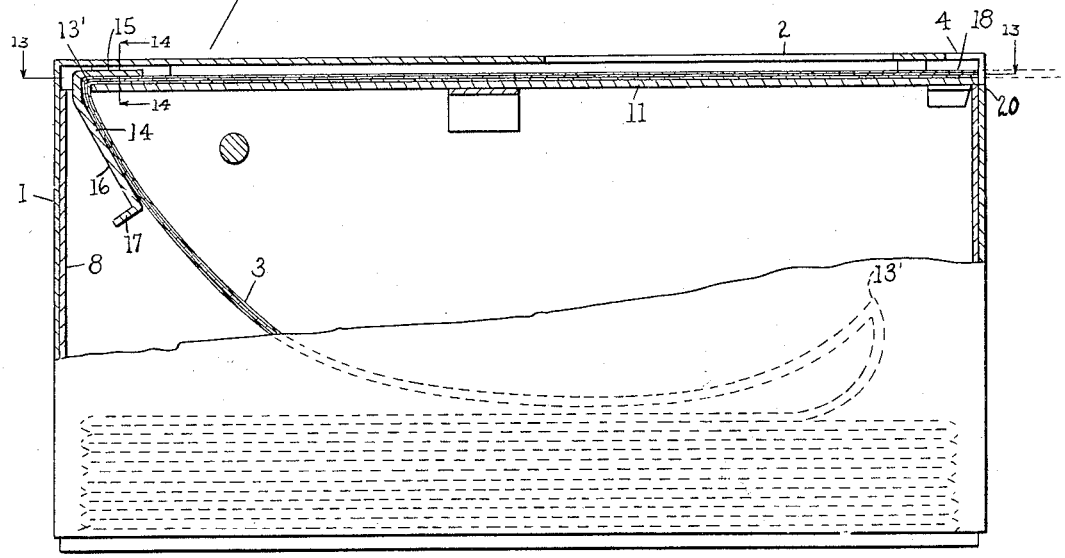
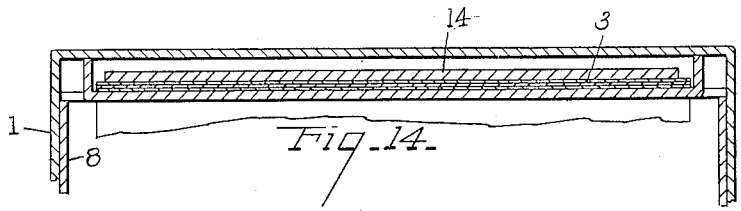
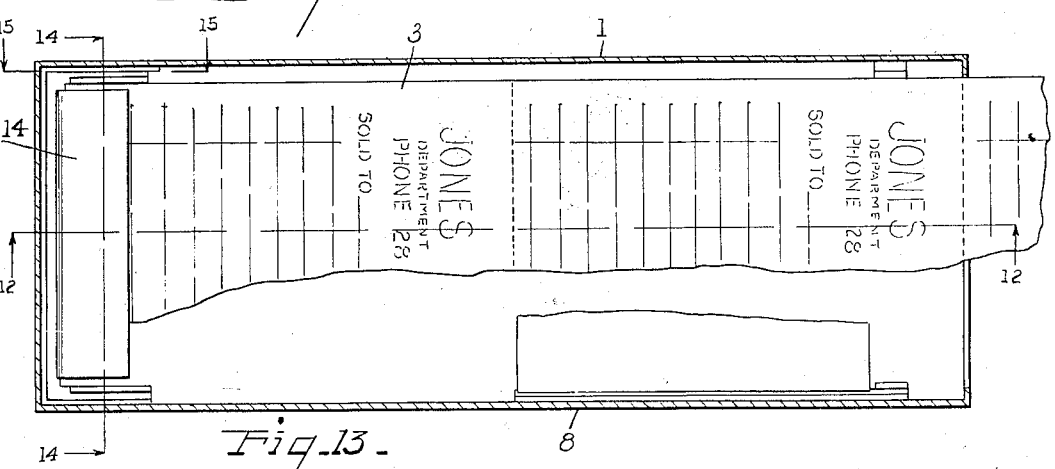
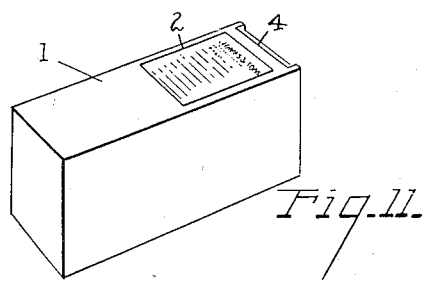
INVENTOR
James A. Henry
John H. Yancey
BY Chappell
and Earl ATTORNEYS Patented May 2, 1933

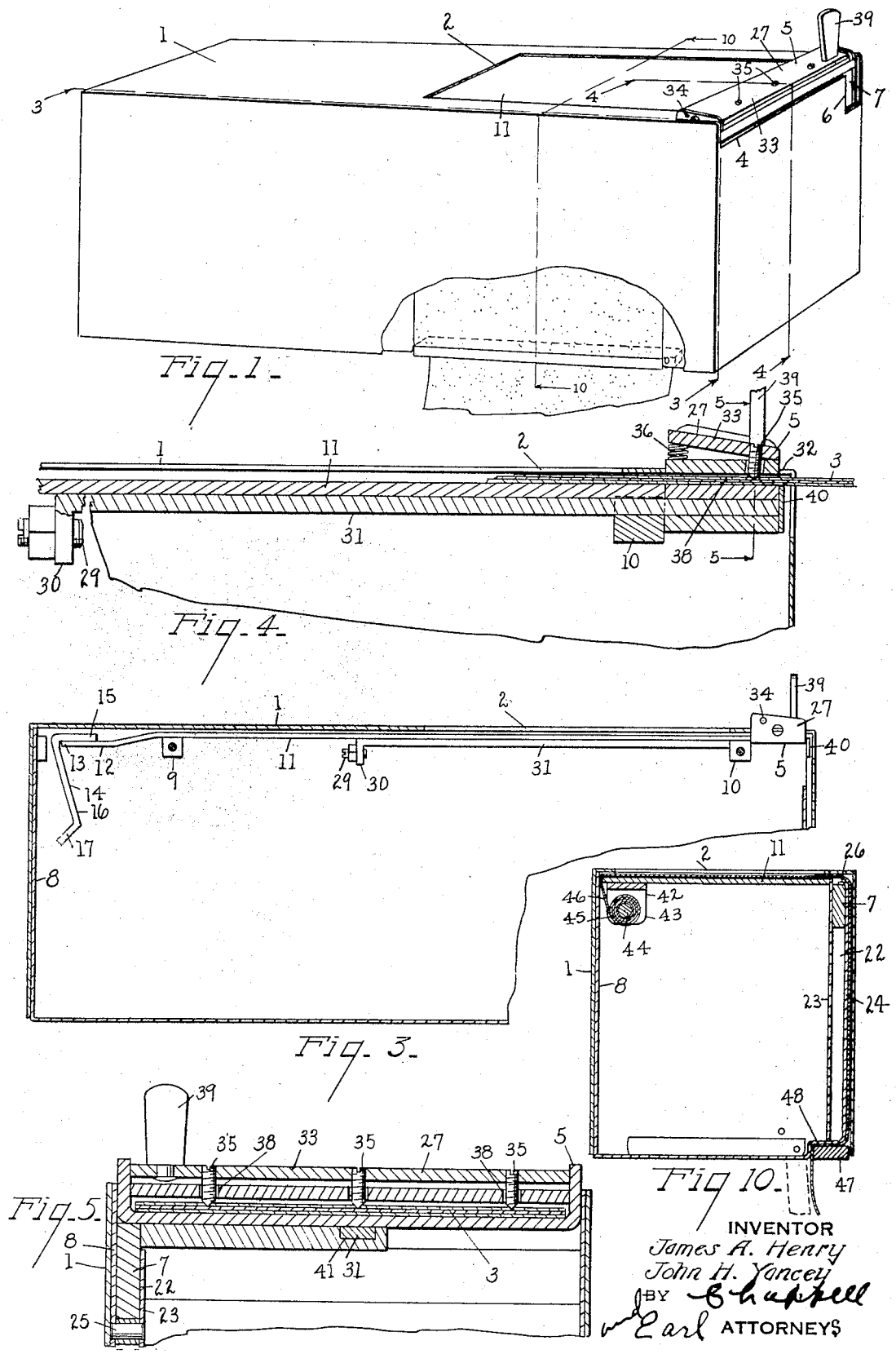

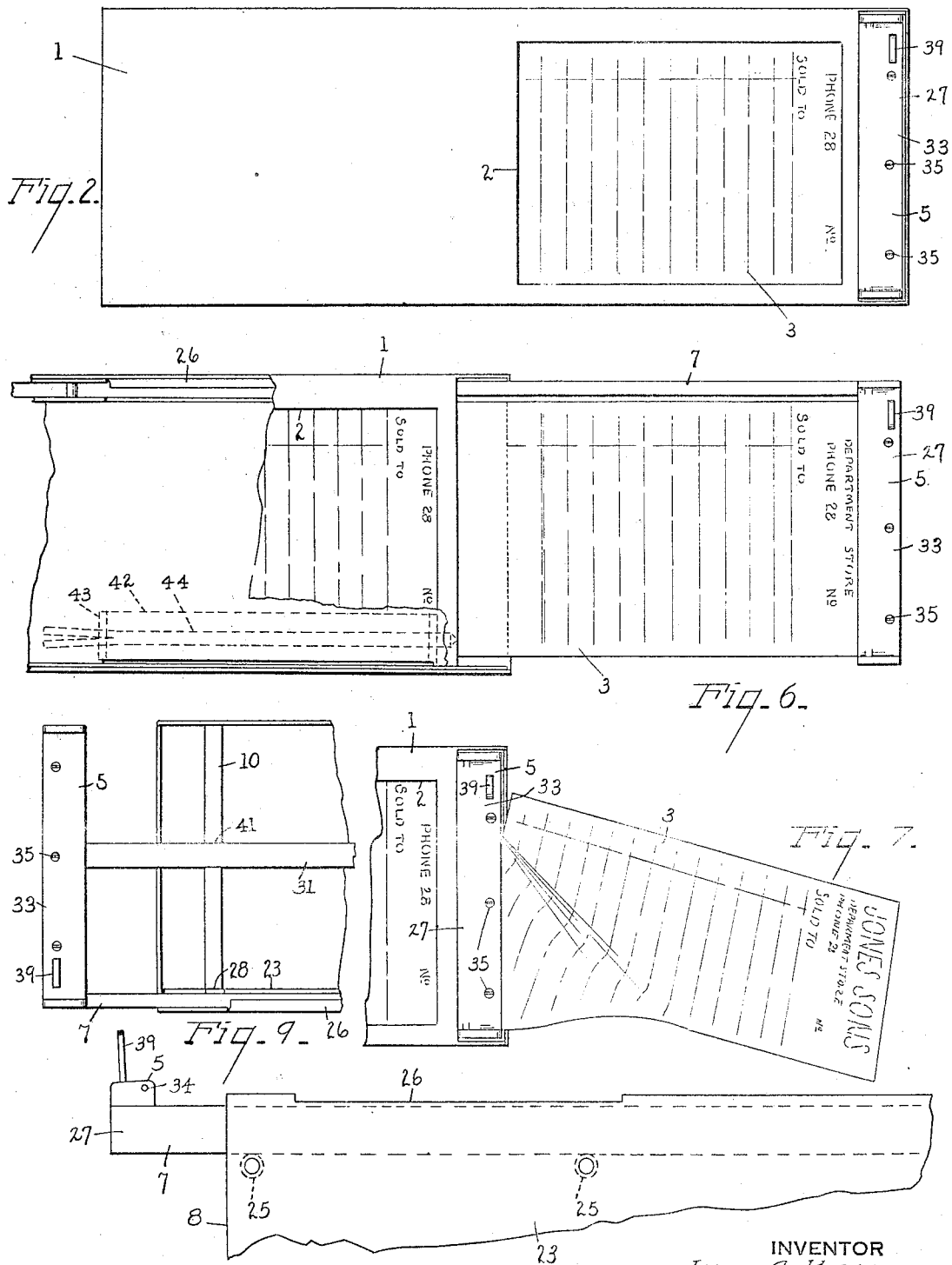

1,906,856

UNITED STATES PATENT OFFICE

JAMES A. HENRY AND JOHN H. YANCEY, OF STURGIS, MICHIGAN

REGISTER

Application filed October 29, 1931. Serial No. 571,707.

The main object of our invention is to provide an autographic register which is simple and economical in construction, light yet strong and durable and convenient and efficient in operation.

Another object of the invention is to provide an autographic register having means associated therewith for regulating feed of the record strip or strips so as to accurately position them for the entry of a record thereon.

Objects relating to details and economies of our invention will appear from the description to follow. The invention is defined and pointed out in the claims.

A structure which is a preferred embodiment of our invention is illustrated in the accompanying drawings, in which:

Fig. 1 is a perspective view of an autographic register embodying our invention.

Fig. 2 is a top plan view.

Fig. 3 is a fragmentary longitudinal vertical section taken on a line corresponding to line 3—3 of Fig. 1.

Fig. 4 is an enlarged fragmentary section taken on a line corresponding to line 4—4 of Fig. 1.

Fig. 5 is an enlarged vertical transverse section taken on a line corresponding to line 5—5 of Fig. 4.

Fig. 6 is a fragmentary top plan view showing the feed slide in its extended or actuated position.

Fig. 7 is a view similar to Figs. 2 and 6, showing the feed slide retracted and the strip partially severed.

Fig. 8 is a fragmentary detail of the slide and its way.

Fig. 9 is a fragmentary top plan view of the register with its cover removed.

Fig. 10 is a vertical transverse section taken on a line corresponding to line 10—10 of Fig. 1.

Fig. 11 is a reduced perspective view of a modified form of our invention.

Fig. 12 is a side view of the modification, parts being broken away and shown in vertical section taken on a line corresponding to line 12—12 of Fig. 13.

Fig. 13 is a plan view of the same, parts being broken away and shown in horizontal section on a line corresponding to line 13—13 of Fig. 12.

Fig. 14 is an enlarged fragmentary transverse section taken on a line corresponding to line 14—14 of Figs. 12 and 13, and Fig. 15 is an enlarged fragmentary detail taken on a line corresponding to line 15—15 of Fig. 13.

Referring to the drawings, the embodiment of our invention illustrated consists of an outer casing or cover 1 which is removable as a unit and is provided with an upper opening 2 for displaying the record strip 3, a corner opening 4 for accommodating the strip feed member 5 and a slot 6 for the passage of the slide bar 7 which carries the strip feed member 5. The casing 1 is preferably made of suitably shaped sheet metal, such as sheet steel or aluminum, which is light yet strong and durable. The casing 1 is adapted to fit snugly over the box 8 which houses the record strip 3.

As illustrated by Fig. 3, the box 8 is provided with cross members 9 and 10 which are secured to and between the sides thereof for supporting the writing table 11 over which the strip 3 may be fed and positioned for the entry of a record thereon. The writing table 11 is removably carried by these cross members and is provided with a downwardly offset rear end portion 12, the end or edge of which constitutes a positioning stop or detent 13 for the record strip 3.

The record strip or strips 3 are weakened on transverse lines 13' against bending resistance, whereby when said strips are engaged by the stop at said weakened lines their advance is checked—that is, there is substantially more resistance—so that the operator is assisted in properly positioning the strips upon the writing table 11. To assist this checking action of the stop 13, there is provided a floating holder 14 of angular shape having a forwardly extending flange 15 resting on the top of the strip as it passes over the downwardly offset portion 12 of the writing table 11 and a downwardly and forwardly extending web 16 which coacts with and guides the strip over and urges it into engagement with the stop 13. The lower edge of the web 16 is provided with an outwardly extending flange 17 for facilitating the passage of the strip past the web 16.

In using the embodiment of our invention shown in Figs. 11 to 15, inclusive, the record strip is fed or advanced by manually grasping the outer end thereof as at 18 in the corner opening 4 of the casing 1 and pulling the strip outwardly. The stiffness of the strips causes them to form a curve as they pass around the edge 13, as shown in Fig. 15, lifting the floating holder 14 substantially as there illustrated. When the point at which the strips are weakened by the perforations reaches the stop 13, the floating holder assists in bringing the strips to the angular position shown in Fig. 12, thereby substantially increasing the resistance to the pull, and this indicates to the operator that the strips are in proper position on the table. The sheets that have been drawn out by this operation are the ones previously positioned on the writing table or tablet and on which entries have been duly made and these sheets or slips may be torn off along the straight edge 20 provided for the purpose.

In the embodiment illustrated by Figs. 1 to 10, inclusive, there is provided a slide for advancing the record strips, which consists of the strip advancing member 5 and the slide bar 7 mentioned above. As illustrated by Figs. 5, 8 and 10, a chamber 22 is provided for the slide bar 7. The plate 23 and the adjacent side wall 24 of the box, together with the rollers 25 and the inturned flange 26 of the side wall 24, constitute a way for the slide rod 7. The inward movement of the member 5 is limited by an upwardly projecting lug 28 on the plate 23, as illustrated by Fig. 9. The outward movement of the member 5 is limited by the adjustable stop 29 which is carried by the downturned end 30 provided on the inner end of the supporting bar 31 which is fixed to the member 5, as illustrated by Figs. 3 and 9. The feed slide 5 is provided with a slot 32 for the passage of the strips 3, as illustrated by Figs. 4 and 5, and means are provided for releasably engaging the strips 3, which consist of the jaw 33 which is pivoted to the member 5 at 34 and carries the pins 35 which are adapted to engage the strips 3 and force them into contact with the bottom of the feed slide, as illustrated by Figs. 4 and 5. The compression spring 36 is disposed between the member 5 and the jaw 33 and is adapted to force the jaw pins 35 into engagement with the strips 3. The pins 35 extend through the openings 38 for this purpose. A handle or finger piece 39 is carried by the forward end of jaw 33 for facilitating the manual operation of the slide 27. When a record has been made upon the strips 3 and it is desired to remove the same from the register, the finger piece 39 is grasped and the slide is advanced or pulled outwardly carrying with it the strips 3. The slide is then retracted by pressing the finger piece 39 toward the register which rocks the jaw 33 about the pivots 34, thereby elevating the jaw pins 35 and releasing the strips 3. The slide is retracted to its original position, leaving the strips 3 advanced. After the slide has been retracted, the strips 3 are torn off, as illustrated by Fig. 7, along the knife-edge member 40 carried by the slide 27.

The central bar 31, as illustrated by Figs. 5 and 9, is adapted to reciprocate in the groove or recess 41 which is provided in the cross member 10 for this purpose. The rearwardly extending bar 31 not only strengthens the slide 27 and improves its operation but it also acts as a support for the strips 3 as they are advanced by and with the slide.

The writing table is provided with a bracket 42 having downwardly extending hangers 43 which support a spindle 44 carrying a roll 45 of transfer paper, such as carbon coated paper. The carbon coated paper 46 passes over the top of the writing table and is threaded between the strips 3. The transfer strip 46 then extends downwardly between the walls of the box and outer casing where it is engaged by the pivoted clamping bar 47 which is pivoted at one end to swing into the longitudinal recess or chamber 48 provided therefor in the bottom box by upwardly offsetting a portion thereof. This provides means for effectively holding the carbon and, at the same time, permits easy manipulation thereof.

In the modification illustrated by Figs. 1 to 10, inclusive, the operation of the floating holder 14 is substantially that described above in connection with Figs. 11 to 15, inclusive. In the modification illustrated by Figs. 1 to 10, inclusive, however, the holder 14 may be omitted without interfering with the successful operation of the device, the stop 29 being adjustable to vary the length of the sections of the record strips. The floating holder, however, coacts with the slide to maintain the strips smooth and uniform over the writing table, avoiding wrinkles, folds, and other irregularities.

Structures embodying our improvements may be made very compact, and their production may be economical. While a relatively light sheet metal may be used, it is also practical to use fiber or binder's board if desired, one of the main objects of our invention being to provide a very economical structure so that a store, for example, may provide each clerk with one of the registers without undue expense.

Our improvements are entirely practical as embodied in Figs. 11 to 15, inclusive, as the operator can readily determine when the strips have been drawn into position for the making of a record. The embodiment of Figs. 1 to 10, inclusive, has the advantage of requiring a little less care on the part of the operator and can be very speedily operated to position the strips for record, it is only necessary to pull outwardly on the slide by grasping the finger piece 39 and to return the slide by pushing inwardly thereon, this inward movement releasing the jaw pins so that the withdrawn sheets may be severed from the strip, the perforations serving the double purpose of facilitating the severing of the strip and also facilitating the positioning of the strips.

It is obvious that various changes and modifications may be made in the details of construction and design of the above specifically described embodiments of our invention without departing from the spirit thereof, such changes and modifications being restricted only by the scope of the following claims.

Having thus described our invention, what we claim as new and desire to secure by Letters Patent is:

1. In a register of the character described, the combination with a casing having a compartment for storing a record strip, a writing table over which said strip may be fed, one end of said writing table constituting a strip positioning stop, said strip being weakened on transverse lines to facilitate bending and engaging said stop at said weakened lines to increase the resistance of the strip and thereby assist in positioning the strip in writing position upon said writing table, and a floating holder of angular shape having a forwardly extending flange resting on said strip and a downwardly and forwardly extending web engaging said strip as it passes to the table.

2. In a register of the character described, the combination with a casing having a compartment for storing a record strip, a writing table over which said strip may be fed, one end of said writing table constituting a strip positioning stop, said strip being weakened on transverse lines to facilitate bending and engaging said stop at said weakened lines to increase the resistance of the strip and thereby assist in positioning the strip in writing position upon said writing table, and a floating holder of angular shape engaging said strip as it passes to the table.

3. In a register, the combination with a box-like casing adapted to receive a record strip having a uniformly spaced series of transverse perforations, of a writing table over which the strip may be drawn, a strip positioning member disposed in advance of said table and over which the strip is drawn, and a floating angular holder member having a portion disposed above said positioning member to rest upon the paper and a portion projecting below said positioning member.

4. In a register, the combination with a box-like casing adapted to receive a record strip having a uniformly spaced series of transverse perforations, of a writing table over which the strip may be drawn, a strip positioning member disposed in advance of said table and over which the strip is drawn, and a floating holder member having a portion disposed above said positioning member to rest upon the paper.

5. In a register, the combination with a casing adapted to receive a zigzag folded record strip having a uniformly spaced series of transverse perforations, of a strip positioning member over which the strip is drawn, and a floating holder member coacting with said positioning member upon the paper and having a portion projecting below said positioning member.

6. In a register, the combination with a casing adapted to receive a zigzag folded record strip having a uniformly spaced series of transverse perforations, of a strip positioning member over which the strip is drawn, and a floating holder member coacting with said positioning member upon the paper.

7. In a register of the character described, the combination with a casing having a compartment for storing a record strip, table supporting and positioning cross members carried by said casing, a slide way at one side of said casing, a slide adapted to reciprocate in said slide way, a strip advancing member carried by said slide and having a slot for the passage of said strip, releasable strip engaging means carried by said strip advancing member and associated with said slot, a central rearwardly extending bar fixed to said strip advancing member and adapted to reciprocate therewith in a recess provided therefor in the top of one of said cross members, said bar having a down-turned flange at its end for engaging said cross member to limit the advance of said slide, an adjustable stop carried by said flange, and a writing table over which said strip may be fed and positioned for the entry of a record thereon.

8. In an autographic register of the character described, the combination with an open inner box and a removable outer casing constituting a compartment for storing manifolding record strips, the walls of said casing extending substantially to the bottom of said inner box, a writing table supported by said box below the top of said casing, said casing having a rectangular opening exposing a portion of said record strip, which strip is fed from said storage compartment over said writing table, a bracket depending from said writing table, a transfer strip supply roll disposed within said compartment and carried by said bracket, said transfer strip passing from said roll to a position between said record strip under said casing opening, thence downwardly between the walls of said box and the outer casing, said box having a longitudinal recess in its bottom into which the transfer strip extends, and a clamping bar pivoted at one end to swing into said recess for engaging and holding in place the end of said transfer strip.

9. In an autographic register of the character described, the combination with an open inner box and a removable outer casing constituting a compartment for storing manifolding record strips, a writing table supported by said box below the top of said casing, said casing having an opening exposing a portion of said record strip, which strip is fed from said storage compartment over said writing table, a bracket depending from said writing table, a transfer strip supply roll disposed within said compartment and carried by said bracket, said transfer strip passing from said roll to a position between said record strip under said casing opening, thence downwardly between the walls of said box and the outer casing, said box having a longitudinal recess in its bottom into which the transfer strip extends, and a clamping bar pivoted at one end to swing into said recess for engaging and holding in place the end of said transfer strip.

10. In an autographic register of the character described, the combination with an open inner box and a removable outer casing constituting a compartment for storing manifolding record strips, a writing table supported by said box below the top of said casing, said casing having an opening exposing a portion of said record strip, which strip is fed from said storage compartment over said writing table, a transfer strip supply roll disposed within said compartment, said transfer strip passing from said roll to a position between said record strip under said casing opening, thence downwardly between the walls of said box and the outer casing, said box having a longitudinal recess in its bottom into which the transfer strip extends, and a clamping bar pivoted at one end to swing into said recess for engaging and holding in place the end of said transfer strip.

11. In a register having a casing adapted to receive a record strip folded zigzag along transverse lines, a writing table over which the strip may be drawn, a strip positioning detent in advance of the table for engaging said strip along the transverse lines thereof, and an oscillatable concave member mounted in position to engage the detent.

12. In a register, a casing, a platen mounted therein, a strip engaging member having a straight edge, and a movably mounted angular member extending partially around said straight edge and adapted to rest upon said member.

13. In a register, a casing, a platen thereon, a strip engaging member behind the platen, said member having a flat top terminating at its rear in a straight edge, and an oscillatably mounted strip engaging element having sides connected substantially at right angles, one side extending forwardly over said member and the other extending downwardly in advance thereof.

In witness whereof we have hereunto set our hands.

JAMES A. HENRY.
JOHN H. YANCEY.